United States Patent
Kuschke et al.

(10) Patent No.: US 8,898,364 B2
(45) Date of Patent: Nov. 25, 2014

(54) METHOD, SYSTEM, AND BUS COUPLER FOR EXCHANGING DATA BETWEEN A HIGHER-LEVEL NETWORK AND A LOWER-LEVEL NETWORK

(75) Inventors: Detlev Kuschke, Schieder-Schwalenberg (DE); Michael Hoffmann, Lemgo (DE); Dominik Weiss, Aerzen (DE)

(73) Assignee: Phoenix Contact GmbH & Co. KG (DE)

( * ) Notice: Subject to any disclaimer, the term of this patent is extended or adjusted under 35 U.S.C. 154(b) by 1080 days.

(21) Appl. No.: 12/937,431

(22) PCT Filed: Apr. 14, 2009

(86) PCT No.: PCT/EP2009/002726
§ 371 (c)(1),
(2), (4) Date: Nov. 17, 2010

(87) PCT Pub. No.: WO2009/124780
PCT Pub. Date: Oct. 15, 2009

(65) Prior Publication Data
US 2011/0060855 A1    Mar. 10, 2011

(30) Foreign Application Priority Data

Apr. 11, 2008    (DE) .......................... 10 2008 018 633

(51) Int. Cl.
| | |
|---|---|
| *G06F 13/14* | (2006.01) |
| *H04L 12/46* | (2006.01) |
| *G05B 19/042* | (2006.01) |
| *H04L 12/24* | (2006.01) |
| *H04L 12/40* | (2006.01) |

(52) U.S. Cl.
CPC ....... *H04L 12/4625* (2013.01); *H04L 12/40006* (2013.01); *H04L 2012/40221* (2013.01); *G05B 19/042* (2013.01); *G05B 2219/25174* (2013.01); *H04L 12/24* (2013.01); *G05B 2219/25012* (2013.01); *H04L 41/00* (2013.01); *H04L 2012/4026* (2013.01)
USPC ........................... 710/305; 709/251; 710/105

(58) Field of Classification Search
USPC .......................... 710/305–306, 105; 709/251
See application file for complete search history.

(56) References Cited

U.S. PATENT DOCUMENTS

| | | | |
|---|---|---|---|
| 2006/0075009 A1 | 4/2006 | Lenz et al. | |
| 2006/0212604 A1* | 9/2006 | Beckhoff et al. | 709/251 |

FOREIGN PATENT DOCUMENTS

| | | |
|---|---|---|
| EP | 1590927 B1 | 7/2006 |
| EP | 1 703 684 A1 | 9/2006 |
| WO | 2004/028090 A1 | 4/2004 |

OTHER PUBLICATIONS

"International Search Report for International Application No. PCT/EP2009/002726", Aug. 13, 2009, Publisher: European Patent Office, Published in: EPO.
"Related International Patent Application No. PCT/EP2009/002726", "International Preliminary Report on Patentability ", Nov. 9, 2010, Publisher: ISA / PCT, Published in: EP.

* cited by examiner

*Primary Examiner* — Faisal M Zaman
*Assistant Examiner* — Kim Huynh
(74) *Attorney, Agent, or Firm* — Kaplan Breyer Schwarz & Ottesen, LLP

(57) ABSTRACT

The invention relates to a bus coupler which converts a network-specific telegram arriving from an external network to an internal data telegram which transmits only the payload data from the network-specific telegram. The internal data telegram also contains at least one state information field for internal control information. The internal data telegram is transferred from the bus coupler to an internal bus system to which multiple bus users are connected in series. Each bus user connected to the internal bus system is able to monitor, in a decentralized and preferably autonomous manner, the communication quality of the lower-level bus system, and to initiate actions, depending on the implementation, on the basis of the internal control information received from the bus coupler, the internal control information generated by the particular bus user, and/or the internal control information received from the directly adjacent bus users.

25 Claims, 4 Drawing Sheets

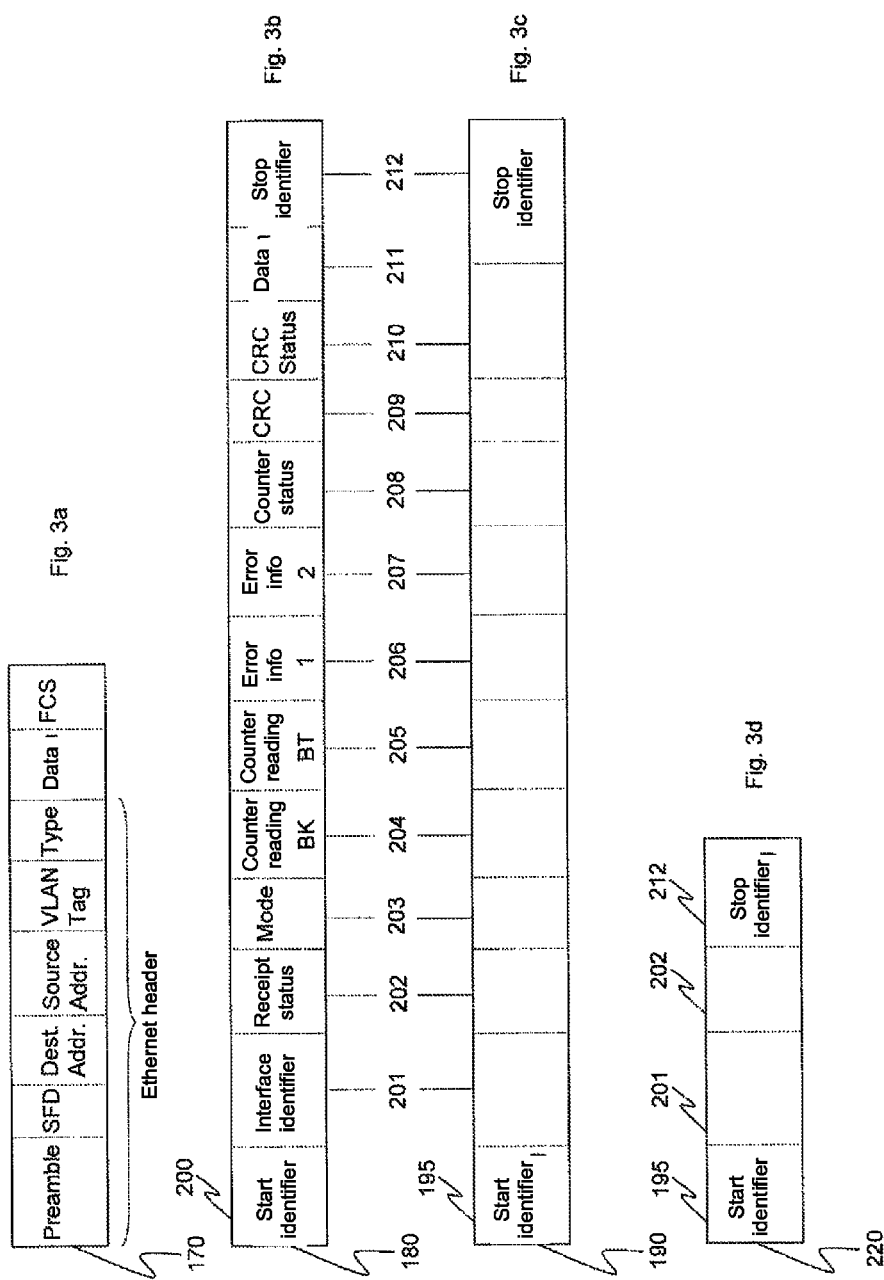

Fig. 4a

Data telegram start identifier 0 0 1 0 0 0 0

Fig. 4b

Control telegram start identifier 1 1 1 1 0 1 1 1 0 1 0 1

METHOD, SYSTEM, AND BUS COUPLER FOR EXCHANGING DATA BETWEEN A HIGHER-LEVEL NETWORK AND A LOWER-LEVEL NETWORK

FIELD OF THE INVENTION

The invention relates in general to automation technology, and in particular to a method, a bus coupler, and a communication system for real-time control of a lower-level bus system.

BACKGROUND OF THE INVENTION

Ethernet-based field bus systems are being increasingly used in automation technology. Based on the Ethernet protocol, these systems use an Ethernet data frame to access a connected device. However, an Ethernet data frame has a considerable overhead of data, which are needed primarily for controlling Ethernet telegrams via an Ethernet-based network.

Another disadvantage of an Ethernet-based field bus system is that each bus user must be physically equipped with an Ethernet interface, even though in many cases it is necessary to span only small distances. This results in unnecessarily high costs.

For carrying out control tasks in real time, it is known from EP 1 590 927 B1 to connect the bus user provided for the real-time application to a ring-shaped transmission path of a lower-level bus system, this ring-shaped transmission path being connected via a network coupler to a higher-level network on which Ethernet telegrams may be transmitted. The network coupler is designed in such a way that an Ethernet telegram which is received by the network via an external interface of the network coupler is relayed to an internal interface of the network coupler and is output on the ring-shaped transmission path, wherein when the Ethernet telegram passes through on the ring-shaped transmission path, each bus user connected to the ring-shaped transmission path exchanges the payload data intended for the particular bus user with the Ethernet telegram circulating on the ring-shaped transmission path. Real-time requirements may be met by reducing the response time of the individual bus users as the result of processing the Ethernet telegrams on the ring-shaped transmission path as they pass through the bus user connected thereto.

However, a disadvantage of the method described in EP 1 590 927 B1 is that the Ethernet telegram circulating on the ring-shaped transmission path contains the above-described overhead of data, which is carried along without any benefit to the lower-level bus system. Transmission bandwidth of the lower-level bus system is thus unnecessarily wasted without the ability to implement management and/or control tasks for the lower-level bus system. In addition, use of the ring-shaped transmission path results in "jitter," which limits the maintenance of real-time requirements.

SUMMARY OF THE INVENTION

The object of the invention is to provide a bus coupler, a communication system, and a method for exchanging data between an external network and a lower-level bus system via a bus coupler, by means of which decentralized and autonomous monitoring of the lower-level bus system is possible without limiting the transmission bandwidth, and in particular also during normal operation, i.e., during the transmission of payload data. In addition, rapid error recognition, and if necessary a rapid response to recognized errors as well as accurate error location in the communication between two bus users, is made possible.

A key concept of the invention is that a bus coupler is provided which converts a network-specific telegram arriving from an external, i.e., higher-level or overlay, network to an internal data telegram which transfers only the payload data from the network-specific telegram. The internal data telegram also contains at least one state information field for internal control information. The internal data telegram is transferred from the bus coupler to a lower-level or underlay, i.e., internal, bus system, to which multiple bus users, also called bus subscribers, are connected in series. Each bus user connected to the internal bus system is able to monitor, in a decentralized and preferably autonomous manner, the communication quality of the lower-level bus system and in particular the communication with its neighboring bus users, and to initiate actions, depending on the implementation, on the basis of the internal control information received from the bus coupler, the internal control information generated by the particular bus user, and/or the internal control information received from the directly adjacent bus users. The decentralized and autonomous monitoring by the bus users takes place during the transmission of payload data, and without reducing the transmission bandwidth. This is achieved by extracting from the bus coupler the control information contained in the header of the network-specific telegrams, and replacing the control information with state information fields for internal control information.

In another aspect of the invention, decentralized and preferably autonomous communication monitoring and/or diagnosis of the lower-level bus system may be carried out even when no payload data are present for transfer to the lower-level bus system in the bus coupler. For this purpose, each bus user generates internal control telegrams itself, and directly exchanges these with its neighboring bus user or its two neighboring bus users via local, independent communication cycles.

Alternatively, instead of internal data telegrams containing payload data, the bus coupler may generate internal control telegrams which are guided by the bus user. Each bus user is able to read internal control information from the control telegram and write in its own control information.

At this point it is noted that the term "internal control telegrams," in contrast to "internal data telegrams," is understood to mean telegrams which contain no payload data from network-specific telegrams. Internal control telegrams may therefore be shorter than internal data telegrams, thus allowing shorter processing or delay times to be achieved in the bus users when internal control telegrams are transmitted.

In another aspect of the invention, low jitter real-time transmission or transfer of payload data received in network-specific telegrams via or on the primary bus system is achieved by means of internal data telegrams generated in the bus coupler. This is achieved using a specialized data telegram start identifier and a control telegram start identifier.

"Decentralized and preferably autonomous monitoring of the communication via the lower-level bus system" is understood to mean that at any time, each bus user is able to rapidly and independently recognize the current state of the lower-level bus system and in particular to recognize its neighboring bus users and, if necessary, respond to malfunctions.

Accordingly, a bus coupler is provided which has an external interface for connecting to a higher-level, i.e., external, network on which network-specific telegrams may be transmitted. "Network-specific" means that the network-specific telegram is generated according to a network or communication protocol which is used by the external network. The bus coupler also has an internal interface for connecting multiple bus users in series to a ring-shaped transmission path of an internal, i.e., lower-level, bus system. A converter device is also provided which is able to convert a network-specific telegram received via the external interface to an internal data telegram for transmission via the ring-shaped transmission path. The term "internal" indicates that the data telegram is intended for the lower-level bus system. The internal data telegram preferably contains only the payload data contained in the network-specific telegram, but no control data of the network-specific telegram. Instead of the control data of the network-specific telegram, the internal data telegram contains at least one state information field for internal control information. The internal data telegram is relayed to the internal interface and is output to the ring-shaped transmission path. When the internal data telegram passes through the corresponding bus user on the ring-shaped transmission path, each bus user connected to the internal interface exchanges the payload data intended for the bus user with the internal data telegram circulating on the transmission path, wherein the bus user is able to extract payload data from a data block, associated with the bus user, in the data field of the internal data telegram, to extract internal control information from the at least one state information field of the internal data telegram, and to insert payload data into the data block, associated with the bus user, of the data field of the internal data telegram, and to insert its internal control information into the at least one state information field of the internal data telegram.

The internal control information may contain bus coupler-related management and/or state information, and/or bus user-related management and/or state information, which for the decentralized and autonomous monitoring of the lower-level bus system is primarily used for monitoring the communication between two respective neighboring bus users. The internal control information is written from the bus coupler and/or from the particular bus user into the corresponding state information field, and is read from the corresponding state information field and evaluated.

The external network is preferably an Ethernet-based network via which Ethernet telegrams are transmitted. Other external networks, such as the PROFIBUS, PROFINET, or CAN bus, for example, may likewise be connected to the external interface of the bus coupler.

The converter device of the bus coupler may be designed in such a way that it converts multiple network-specific telegrams received via the external interface, which may be temporarily stored in the bus coupler, to an internal data telegram which in turn contains no control data of the network-specific telegrams. The network-specific telegrams that are converted to an internal data telegram are preferably limited to the number for which the data field does not have to be enlarged. This ensures that the transmission bandwidth is not reduced.

Of course, the converter device may be designed in such a way that it is able to convert an internal data telegram received via the internal interface to at least one network-specific telegram for transmission via the external interface. In addition, multiple internal data telegrams may also be converted to a network-specific telegram.

The bus coupler may have a device for generating internal control telegrams. Internal control telegrams may be transmitted via the lower-level bus system when no network-specific telegrams, i.e., no payload data, are present on the bus coupler for transmission via the lower-level bus system. An internal control telegram contains a start identifier field into which the bus coupler is able to write an identifier which identifies the internal control telegram, and contains at least one state information field for writing and reading bus coupler-related and/or bus user-related control information which is used in particular for decentralized monitoring and diagnosis of the communication between two respective bus users. The internal data telegram also contains a start identifier field for a start identifier which identifies the internal data telegram. Internal control information relating to the bus user is written by the particular bus user into the at least one state information field of the internal control telegram, and is read therefrom. This ensures that during normal operation, i.e., during the transmission of payload data via the lower-level bus system, as well as during the inactive operating state, internal control information concerning the decentralized monitoring of the communication may be exchanged between two respective bus users. For this purpose a control unit is preferably provided in the bus coupler which initiates the transmission of internal control telegrams via the internal interface on the ring-shaped transmission path when no payload data are present for transmission via the ring-shaped transmission path.

To allow real time-capable payload data transmission via the lower-level bus system, in response to a start identifier which identifies an internal data telegram the control unit is able to interrupt or terminate the transmission of internal control telegrams in a defined manner, thus allowing transmission of the internal data telegram via the lower-level bus system in real time.

At this point it is noted that internal data telegrams which are transmitted via the lower-level bus system advantageously cannot be interrupted or terminated by an internal control telegram.

To improve the decentralized and preferably also autonomous monitoring of the communication quality of the lower-level bus system by the bus users, the bus coupler has a telegram counter which consecutively counts the internal data telegrams and/or control telegrams which are actually sent via the internal interface. As a result, the internal data telegrams and/or control telegrams each have an additional state information field into which the bus coupler is able to write the current value of the telegram counter. It is noted that this additional state information field can only be read, not overwritten, by the bus users. In other words, the internal data telegrams and/or control telegrams sent by the bus coupler via the internal interface contain consecutive numbers.

Accordingly, a communication system is provided which contains the above-described bus coupler, as well as multiple bus users which are connected in series via a ring-shaped transmission path of a lower-level bus system to the internal interface of the bus coupler. The bus users are each designed to interpret the internal data telegrams passing through on the ring-shaped transmission path and to carry out a data exchange.

Each bus user advantageously has the following features:

A first interface having a first transmitting and receiving unit for transmitting and receiving internal data telegrams and/or control telegrams to or from a neighboring bus user, and a second interface having a second transmitting and receiving unit for transmitting and receiving internal data telegrams and/or control telegrams to or from a second neighboring bus user.

To allow decentralized and preferably autonomous monitoring of the communication quality within the lower-level bus system over independent communication cycles between two respective neighboring bus users, each bus user has a device for generating internal control telegrams, each containing a start identifier field for a start identifier which identifies the internal control telegram, and at least one state information field. The particular bus user is able to read from such a state information field state information from one of its neighboring bus users, or to write its own state information into such a state information field. The control telegrams generated by the particular bus user are transmitted only to the neighboring first and/or second bus user of said bus user. This allows decentralized and autonomous diagnosis of the lower-level bus system with regard to each individual point-to-point connection in the lower-level bus system, without the need for a central control unit.

So that each bus user is able to recognize whether the interfaces of its neighboring bus users with which it communicates are properly connected, and/or whether crosstalk or a short circuit has occurred in at least one neighboring bus user, a different interface identifier is associated in each case with the first and the second interface of each bus user. As a result, the internal data telegrams and/or control telegrams preferably each contain an additional state information field for an interface identifier. Each bus user has a device for reading an interface identifier and for writing an interface identifier into the additional state information field. Faulty transmission of control telegrams or data telegrams, which may occur, for example, due to crosstalk or as the result of a short circuit in a neighboring bus user, is recognized by the particular bus user on the basis of the received interface identifier.

To allow improved monitoring of the transmission quality between neighboring bus users, each bus user may have a device for determining the reception quality at its first and second interfaces. Such determining devices are known per se. For example, the reception quality may be determined based on the determined bit error rate of received and evaluated internal data telegrams and/or control telegrams. To allow information concerning the reception quality to be transmitted, the internal data telegrams and/or control telegrams each contain an additional state information field for reception state information. In addition, each bus user has a device for reading reception state information and for writing reception state information into the additional state information field.

Each bus user advantageously has a device which is able to block the respective first or second interface in response to at least one state information item received in an internal data telegram or control telegram. This ensures that a bus user which precedes the detected fault location is able to close its corresponding interface so that the remainder of the lower-level bus system may continue to operate.

Each bus user may have an interruption device which interrupts or terminates the generation and/or transmission of internal control telegrams in a defined manner in response to the start identifier contained in a received internal data telegram, so that real-time transmission of an internal data telegram which is currently present may be ensured. Such an interruption device is advantageous in each bus user when two respective neighboring bus users are to exchange their own generated internal control telegrams in independent communication cycles and to transmit internal data telegrams in real time.

To also allow the bus users, preferably the receiver and/or transmitter units thereof, to be synchronized when no payload data are transmitted, the start identifier which identifies an internal control telegram may contain a corresponding bit pattern. Such bit patterns may be generated using coded diphase encoding or Manchester encoding, for example.

To allow low-jitter, real-time transmission of internal data telegrams via the lower-level bus system, the start identifier which identifies an internal data telegram and the start identifier which identifies a control telegram may contain respectively different bit patterns in such a way that the transmission of internal control telegrams may be interrupted or terminated in a defined manner, preferably within a bit duration. Defined time references with a small amount of jitter which are transmitted in internal control telegrams may thus be directly distributed to all bus users in the lower-level bus system. In this manner high synchronization accuracy may be achieved, using simple means.

The start identifier which identifies an internal data telegram and/or the start identifier which identifies a control telegram each preferably contain a first and a second bit pattern. The bus users are designed in such a way that they are able to fully recognize a received start identifier by means of the first bit pattern. The processing or delay time in the bus users may be reduced as a result of the start identifier being recognizable before it has completely arrived. The second bit pattern may be used a short time thereafter to be able to determine with greater certainty whether the received bit patterns actually represent a complete, valid start identifier. If the second bit pattern does not correspond to the expected value, the relaying of the internal control telegram or data telegram may be interrupted or terminated.

If the external network and/or the bus coupler malfunction(s), safety-relevant data may be transmitted in the internal control telegrams generated by the bus users. For this purpose an additional data field is provided for transmitting safety-relevant data in the internal control telegram. The bus coupler and/or each bus user is/are designed for reading safety-relevant data from the additional data field and for writing safety-relevant data into the data field.

To further improve the decentralized and autonomous diagnosis or monitoring of the communication quality of the lower-level bus system, each bus user has an error recognition device associated with the first and the second interface which is able to check and determine whether, and if so how many, faulty internal data telegrams and/or control telegrams have been received at the first and/or second interface, and/or whether, and if so how many of, the internal data telegrams and/or control telegrams sent to the particular bus user have not been recognized or have been lost. To be able to inform neighboring bus users of incorrectly received internal data telegrams or control telegrams and/or of unrecognized or lost data telegrams or control telegrams, the internal data telegrams and/or control telegrams each contain additional state information fields in which the particular result from the error recognition device may be transmitted.

In order to detect unrecognized or lost internal data telegrams and/or control telegrams, the error recognition device for each bus user preferably has a first telegram counting device associated with the first and the second interface which consecutively counts the internal data telegrams and/or control telegrams sent via the first interface, and which likewise consecutively counts the internal data telegrams and/or control telegrams sent via the second interface. The internal data telegrams and control telegrams may each have a telegram number field as an additional state information field into which the particular value of the first telegram counting device may be written. By comparing the current count value transmitted by the bus coupler, which indicates how many internal data telegrams and/or control telegrams have previously been transferred to the lower-level bus system, to the count value of the corresponding telegram counting device transmitted in a telegram number field of a data telegram or control telegram, which together with the count value of the bus coupler is transmitted in the data telegram or control telegram, the particular bus user is able to determine whether its neighboring bus user has not recognized internal data telegrams and/or control telegrams.

In order to detect unrecognized or lost internal data telegrams and/or control telegrams, alternatively or additionally the error recognition device may have a second telegram counting device associated with the first and the second interface which counts the internal data telegrams and/or control telegrams received at the first interface and which likewise counts the internal data telegrams and/or control telegrams received at the second interface. The error recognition device of a corresponding bus user recognizes its own faulty receiver units by comparing the count value, which indicates how many internal data telegrams and/or control telegrams the particular neighboring bus user has transmitted, to the corresponding count value with regard to the first or second interface, which indicates how many internal data telegrams and/or control telegrams the first or second receiver unit has received. The current number of unrecognized control telegrams and/or data telegrams with regard to the first and the second interface is determined from the results of the comparison. These numerical values are transmitted by the corresponding bus user to its neighboring bus users in internal data telegrams or control telegrams respectively containing two additional state information fields. Thus, each bus user may be provided with a maximum of six numerical figures, namely, two values of its own and two values from each of its two neighboring bus users. Based on the available values, each bus user is able to independently compare the state of its two receiver units to the state of the receiver units of its neighboring bus users. In this manner each bus user is able to recognize whether, and if so how many, errors have occurred only in its own receiver units, for example due to a single faulty contact of the data line, or whether, and if so how many, errors have occurred in multiple bus users, for example due to high electromagnetic compatibility (EMC) disturbances.

Each bus user is able to generate a check sum in order to recognize whether internal data telegrams and control telegrams have been incorrectly received at the first and/or second interface of a bus user. For this purpose, each bus user has a device for generating a check sum, which is formed over each internal data telegram or control telegram to be sent. The check sum may be formed over defined sections of the telegram. For an internal control telegram or data telegram, the check sum is advantageously computed only from the data which precede the check sum field. The check sum represents additional state information. To allow the check sum to be transmitted to neighboring bus users, the internal data telegrams or control telegrams each have a check sum field as an additional state information field, into which the particular bus user is able to write the generated check sum. In addition, each bus user contains a device for reading and evaluating the check sum received in a data telegram and/or control telegram. In the evaluation of the check sum received in a data telegram or control telegram, the bus user preferably first forms the check sum over the received data telegram or control telegram, or over the specified section of the received data telegram or control telegram, and compares the computed check sum to the check sum contained in the received data telegram or control telegram. Misrecognized control telegrams and/or data telegrams are consecutively counted. In addition, the sum of all misrecognized and unrecognized control telegrams and/or data telegrams is formed in each bus user.

With the aid of the error recognition device, "creeping" errors in the internal bus system of each bus user may be recognized in a decentralized and autonomous manner and automatically reported to the higher-level control unit. If a corresponding bus user determines that misrecognized and/or lost data telegrams and/or control telegrams have accumulated over time at one of the six interfaces which it monitors, the bus user is able to generate appropriate error information and transmit same in a data telegram to the bus coupler during a data telegram transmission. The error information does not have to be transmitted immediately. Rather, the aim is to recognize and interpret errors which occur over a fairly long period of time. The error information may contain the number of misrecognized and/or unrecognized data telegrams and/or control telegrams, the interface identifier, and information concerning the affected bus user. Alternatively or additionally, the error information may contain a difference value which indicates the difference between the number of misrecognized and/or unrecognized control telegrams and/or data telegrams of the clearly faulty interface, and the average value which is formed over the misrecognized and/or unrecognized control telegrams and/or data telegrams of the remaining interfaces. The bus coupler, and therefore maintenance personnel, may be informed of the state of the interfaces of the connected bus users by means of this error information. The maintenance personnel are then able to replace a bus user in a timely manner before it completely fails.

Accordingly, a method is provided for exchanging data between a network, on which Ethernet telegrams may be transmitted, and multiple bus users via a bus coupler. The network is connected to an external interface of the bus coupler. The plurality of bus users is connected in series to a ring-shaped transmission path via an internal interface of the bus coupler. An Ethernet telegram received via the external interface of the bus coupler is converted in a converter device to an internal data telegram which contains no control data of the Ethernet telegram. The internal data telegram contains at least one state information field for internal control data. The internal data telegram is relayed to the internal interface of the bus coupler and is output on the ring-shaped transmission path. When the internal data telegram passes through the corresponding bus user on the ring-shaped transmission path, each bus user connected to the internal interface exchanges the payload data intended for the bus user with the internal data telegram circulating on the transmission path, wherein the bus user is able to extract payload data, associated with the bus user, from a data block in the data field of the internal data telegram, to extract internal control data from the at least one state information field of the internal data telegram, and to insert payload data into the data block, associated with the bus user, of the data field of the internal data telegram, and to insert internal control information into the at least one state information field of the internal data telegram.

The internal control data advantageously contain bus user-related state information. Each bus user is able to generate internal control telegrams which each contain a start identifier field for a start identifier which identifies the internal control telegrams, and at least one state information field for bus user-related state information. The state information is used for decentralized and autonomous monitoring and/or diagnosis of the communication between two respective bus users. When no internal data telegrams for transmission are present in the bus coupler, respective neighboring bus users are able to exchange via independent communication paths internal control telegrams which are used for the decentralized and autonomous monitoring of the communication between two respective bus users.

BRIEF DESCRIPTION OF THE DRAWINGS

The invention is explained below with reference to several exemplary embodiments in conjunction with the accompanying drawings, which show the following:

FIG. 3a: shows a schematic design of an Ethernet telegram;

FIG. 3b: shows an example of an internal data telegram generated in the bus coupler;

FIG. 3c: shows an example of an internal control telegram generated in the bus coupler or a bus user;

FIG. 3d: shows an alternative, abbreviated internal control telegram generated in the bus coupler or a bus user;

FIG. 4a: shows an example of a start identifier of an internal data telegram; and FIG. 4b: shows an example of a start identifier of an internal control telegram.

DETAILED DESCRIPTION

Figure 1:
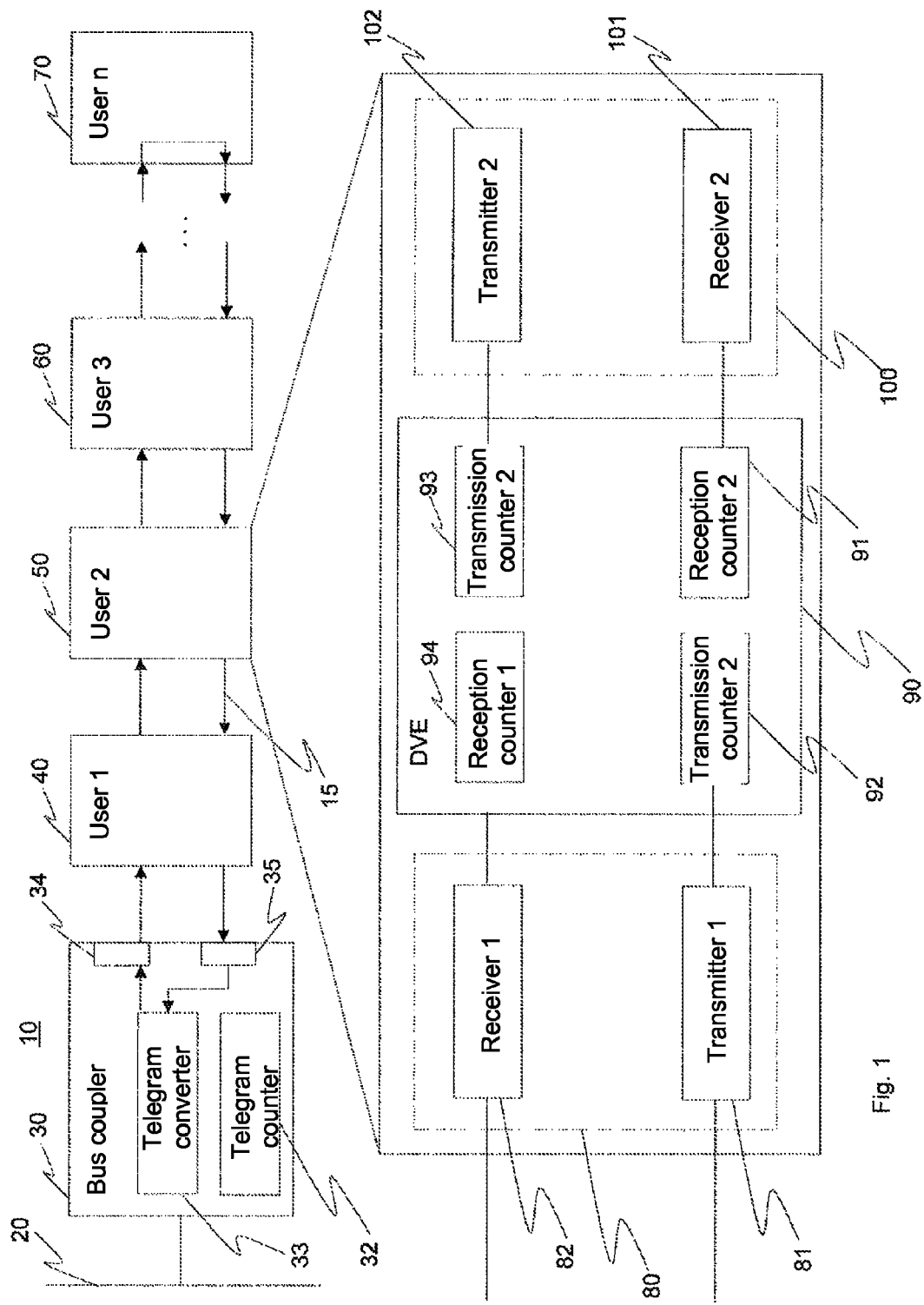
FIG. 1: shows an example of a lower-level bus system which is connected to an external network via a bus coupler, and a detailed design of a bus user.

FIG. 1 shows an example of a communication system 10, which may be an automated system. The automated system 10 has a higher-level, i.e., external, network 20 which in the present example is an Ethernet-based network. Ethernet telegrams may be transmitted via the external network 20. A structure of an Ethernet telegram 170, known per se, is illustrated in FIG. 3a. The higher-level network 20 is connected to a lower-level, i.e., internal, bus system 15 via a bus coupler 30. In the present example the internal bus system 15 includes a ring-shaped transmission path. The bus coupler 30 has an interface (not illustrated) to which the external network 20 is connected. The bus coupler also has an internal interface which contains a transmitter unit 34 and a receiver unit 35, to which a bus user 40 of the bus system 15 is connected. The lower-level bus system 15 includes, for example, n bus users 40 through 70 connected in series.

In addition, a telegram converter device 33 is implemented in the bus coupler 30 which converts the Ethernet telegrams arriving from the higher-level network 20 to internal data telegrams. An example of an internal data telegram 180 is shown in FIG. 3b. At this point it is noted that some of the state information fields shown in FIG. 3b are written into, read, and processed not by the bus coupler 30, but, rather, by the bus users.

In one advantageous embodiment, the telegram converter device 33 extracts the Ethernet header containing control data from each received Ethernet telegram 170, and writes primarily only the payload data transmitted in the data field into the data field 211 of an internal data telegram. The Ethernet telegrams 170 are preferably converted into internal data telegrams of equal length. The data telegrams 180 are transferred via the transmitter unit 34 to the lower-level bus system 15, and via bus users 40 through 70 are transmitted back to the receiver unit 35. In addition, a telegram counter 32 is implemented in the bus coupler 30 which consecutively counts the internal data telegrams 180 to be sent via the transmitter unit 34. The consecutive number is entered into field 204 of each data telegram 180 to be sent. Field 204 is denoted as counter reading BK.

Instead of internal data telegrams, the bus coupler 30 may generate internal control telegrams which contain no payload data of an Ethernet telegram. In this case the telegram counter 32 consecutively counts the data telegrams and control telegrams to be transmitted. Two examples of internal control telegrams are shown in FIG. 3c and FIG. 3d. The internal control telegrams are explained in greater detail below.

It is pointed out here that in one preferred embodiment, each bus user may generate internal control telegrams which it is able to exchange, via independent communication cycles, with its neighboring bus users for decentralized and autonomous monitoring of the lower-level bus system 15.

The example of the design of bus users 40 through 70 is described in greater detail by way of example with reference to bus user 50.

Bus user 50 has a first interface 80 via which bus user 50 is connected to a first neighboring bus user, in the present example, to bus user 40. First interface 80 contains a receiver 82 and a transmitter 81. Denoting receiver 82 and transmitter 81 as receiver 1 and transmitter 1, respectively, makes it clear that bus user 50 is connected to first [bus] user 40 via a reception line Rx1 and a transmission line Tx1. Bus user 50 also contains a second interface unit 100, via which bus user 50 is connected to a second neighboring bus user, in the present example, to bus user 60. The second interface 100 in turn contains a transmitter 102 and a receiver 101. Transmitter 102 and receiver 101 are also denoted as transmitter 2 and receiver 2, respectively, in order to make it clear that bus user 50 is connected to the second neighboring bus user 60 via a transmission line Tx2 and a reception line Rx2. It is pointed out here that interface identifier 1 may be associated with the first interface of each bus user, and interface identifier 2 may be associated with the second interface of each bus user. In addition, each interface identifier may additionally contain an individual identifier for the particular bus user to allow the respective interfaces to be identified more clearly. A data processing and control unit 90 is connected to the first interface 80 as well as to the second interface 100. The data processing and control unit 90 may have, among other elements, a transmission counter 93 which consecutively counts the internal control telegrams and/or data telegrams to be transmitted via transmitter 102 to bus user 60, while a second transmission counter 92 consecutively counts the internal data telegrams and/or control telegrams to be transmitted via transmitter 81 to bus user 40. The data processing and control unit 90 may also have a reception counter 94 which counts the internal data telegrams and/or control telegrams received at receiver 82 from bus user 40. A second reception counter 91 counts the internal data telegrams and/or control telegrams arriving at receiver 101 from bus user 60. It is noted that the data processing and control unit 90 as well as transmission counters 92 and 93 and reception counters 91 and 94 may also be designed as separate components. In addition, the data processing and control unit 90 may be designed to compute a check sum from predefined data of an internal control telegram and/or data telegram, and to compare an internally computed check sum to a check sum which is received in a control telegram or data telegram in order to be able to recognize incorrectly received data telegrams or control telegrams. The data processing and control unit 90 may also compare the current counter readings of reception counters 91 and 94 to the current counter readings of the transmission counters of neighboring bus users 40 and 60 in order to be able to identify unrecognized or lost data telegrams or control telegrams. The transmission counters and reception counters are also referred to as telegram counting devices. These capabilities are explained in greater detail below. Transmission counters 92 and 93, reception counters 91 and 94, the device for computing check sums, and the comparators may also be referred to collectively as an error recognition device.

FIG. 3b, which shows one example of a structure of an internal data telegram 180 which may be generated by bus coupler 30, is considered once more. Such a data telegram may contain optional fields 200 through 212, which in the present example are provided in sequence for the following identifiers and control information, management information, and/or state information:

A data telegram start identifier; an interface identifier of a bus user, which denotes a first or second interface of a bus user; information concerning the reception state of a first or second interface of a bus user; a mode identifier which, for example, determines the number, quantity, and content of the fields, indicates the higher-level network type and/or lower-level bus system type and the like, and/or denotes a control telegram or data telegram (this information may also reside in separate fields); the consecutive number generated in bus coupler 30 for data telegrams to be sent; the consecutive number generated by a bus user for data telegrams to be sent via the first or second interface of the bus user; error information regarding the first interface of a bus user, which indicate whether data telegrams have been misrecognized or not recognized at all; error information regarding the second interface of the bus user, which indicate whether data telegrams have been misrecognized or not recognized at all; counter status information which indicates when it has not been possible to properly update or reset a counter; a CRC check sum, for example, which secures the data which precede it, and which is recomputed by each bus user before sending a data telegram; CRC status information which indicates an error which has previously occurred in a neighboring bus user, as a result of which the information present in fields 203 and 204, which is relayed unchanged from one bus user to the next, is no longer evaluated; the payload data extracted from an Ethernet telegram; and a data telegram stop identifier. It is noted that the Ethernet telegram 170 shown in FIG. 3a and the internal data telegram shown in FIG. 3b may be of equal length. With the aid of the particular internal data telegram, the communication quality of the internal bus system 15 may also be monitored in a decentralized and autonomous manner by the connected bus users 40 through 70 during operation, i.e., during the transmission of payload data. A central control unit is therefore unnecessary.

FIG. 3c shows a first example of an internal control telegram 190, which may be generated by bus coupler 30, in particular, however, by the bus users. Control telegram 190 may contain the same fields 201 through 210 and 212 as data telegram 180. The control telegram likewise contains a start identifier field 195. However, a control telegram contains no payload data field 211 in which payload data of an Ethernet telegram may be transmitted. In addition, the start identifier of a control telegram differs from the start identifier of a data telegram, as shown in FIGS. 4a and 4b. One reason for this, as described below, is that a data telegram is able to interrupt or terminate the transmission of a control telegram in a defined, and therefore precise, manner.

FIG. 3d shows an alternative control telegram 220 which is abbreviated compared to control telegram 190, and which contains only the start identifier field 195 and fields 201, 202, and 212 of control telegram 190. With the aid of abbreviated control telegrams 220, shorter processing or delay times may be achieved in the bus users, and therefore control information may be exchanged more rapidly between neighboring bus users.

If it is to be possible for the transmission of the control telegrams shown in FIGS. 3c and 3d to be interrupted or terminated, as described below, the individual bits of the payload information fields (201 through 210, and 201 and 202, respectively) are separated by fixed bit sequences or individual bits. This measure prevents a valid start identifier for a data telegram from being erroneously generated from an interrupted control telegram.

FIG. 1 is considered once again. The data processing and control unit 90 may have the capability for reading the start identifier field 200 of a data telegram, the start identifier field 195 of a control telegram, and the state information fields 201 through 212 of a control telegram or data telegram, and to evaluate the read information in order to carry out implemented functions as needed. In addition, depending on the system implementation, the data processing and control unit 90 may write corresponding user-related state information into the respective state information fields, for example fields 201, 202, and 204 through 210. Furthermore, the data processing and control unit 90 is able to read the payload data of a data telegram intended for bus user 40 from the data block of data field 211 which is associated with bus user 40, and if necessary, to write user-related payload data into this data block. The data processing and control unit 90 may also be designed to be able to determine the reception quality of the first interface 80, which represents the quality of the combination of receiver 82, reception line Rx1, and transmitter 132, and to determine the reception quality of receiver 101 for the second interface 100, which reflects the quality of the combination of receiver 101, reception line Rx2, and transmitter 141. The transmission quality of line Rx1 between receiver 82 of bus user 50 and transmitter 132 of bus user 40 as well as the transmission quality of line Rx2 between receiver 101 of bus user 50 and transmitter 141 of bus user 60 is also determined in this way.

FIG. 2 is considered once again. For the sake of simplicity in the illustration, only the three bus users 40, 50, and 60 are shown. In addition, communication cycles between bus user 50 and its two neighboring bus users 40 and 60 are schematically indicated, via which control telegrams may be exchanged in a decentralized manner between bus users 40 and 50 and bus users 50 and 60, independently of one another. The communication quality of the internal bus system 15 and in particular the communication between neighboring bus users 40 and 50 or 50 and 60 may thus be monitored in a decentralized and autonomous manner and diagnosed, even if no payload data are transmitted in data telegrams by the bus coupler.

As previously mentioned, all bus users may have the same design. Consequently, bus user 40 contains a first interface unit 110 having a receiver 112 and a transmitter 111, a data processing and control unit 120, and a second interface unit 130, which in turn has a transmitter 132 and a receiver 131. The data processing and control unit 120 is in turn connected to the first and second interface units. Similarly, bus user 60 has a first interface unit 140, which once again contains a receiver 142 and a transmitter 141. In addition, a data processing and control unit 150 is implemented in the bus user. A second interface unit 160 once again contains a transmitter 162 and a receiver 161. It is apparent from FIG. 2 that bus user 50 is connected via its first interface 80 to the second interface 130 of bus user 40, and is connected via its second interface 100 to the first interface 140 of bus user 60. The other bus users are similarly connected to their respective neighboring bus users.

The mode of operation of the communication system 10 in FIG. 1 is explained in greater detail below.

1. Preferred Transmission of Control Telegrams in Local Independent Communication Cycles A scenario is assumed in which no Ethernet-based telegrams intended for bus coupler 30 are currently transmitted via the external network 20. As a result, no payload data are present in the bus coupler 30 which must be transmitted via the lower-level bus system 15. To still be able to carry out decentralized and autonomous monitoring of the lower-level bus system 15, bus users 40 through 70 generate internal control telegrams, for example in the respective data processing and control unit, which are exchanged between neighboring bus users in independently developed communication cycles. This exchange of control telegrams is explained in greater detail below with reference to the independent communication connections which are developed between bus users 40 and 50 or 50 and 60.

The data processing and control unit 120 of bus user 40 once again generates internal control telegrams, which may have the format shown in FIG. 3d, for example. First, a start identifier is written into the start identifier field 220 of a control telegram to be generated, which may be composed of the bit sequence "111101110101" shown in FIG. 4b. Since the internal control telegram is to be transmitted to user 50 via the transmitter 132 of the second interface unit 130, in the error-free case the number "2," which denotes the second interface 130 of bus user 40, is written into field 201 shown in FIG. 3d. The data processing and control unit 120 may be designed in such a way that it is able to determine the reception quality with regard to the first interface 110, i.e., the combination of receiver 112, the transmitter of bus coupler 15, and reception line Rx2, and with regard to the second interface 130, i.e., the combination of receiver 131, transmission line Tx1, and transmitter 81. It is assumed that the data processing and control unit 120 has determined adequate reception quality with regard to interface 130. Consequently, the data processing and control unit 120 writes a logical "1", for example, into field 202 shown in FIG. 3d which indicates that the receiver status is good. The individual bits of fields 201 and 202, as mentioned above, are respectively separated from one another by a fixed bit sequence, for example. The control telegram is not closed off by the stop identifier shown in FIG. 3d. The internal control telegram, which contains, among other items, information concerning the reception state of the combination of receiver 131, transmission line Tx1, and transmitter 81, is then transmitted from the transmitter 132 of bus user 40 to the receiver 82 of bus user 50. Further control telegrams are transmitted to bus user 50 in a similar manner.

The data processing and control unit 90 of bus user 50 generates control telegrams in a similar manner, but independently of bus user 40. In particular, during proper operation the data processing and control unit 90 writes the interface identifier "1" of the first interface 80 into corresponding field 201 of a control telegram to be transmitted. The data processing and control unit 90 may be designed in such a way that it is able to determine the reception quality of the combination of receiver 82, reception line Rx1, and transmitter 132, and the combination of receiver 101, reception line Rx2, and transmitter 141. It is assumed that the data processing and control unit 90 has also determined adequate reception quality with regard to receiver 81. Consequently, the data processing and control unit 90 writes a logical "1," for example, into field 202 shown in FIG. 3d which indicates that the receiver status is good. The individual bits of fields 201 and 202, as mentioned above, are each separated from one another by a fixed bit sequence, for example. The control telegram is not closed off by the stop identifier shown in FIG. 3d.

Transmitter 81 then transmits the generated control telegram and further control telegrams to the receiver 131 of bus user 40, independently of bus user 40.

Similarly, the data processing and control units of all bus users 40 through 70 may independently generate control telegrams and transmit same to their respective neighboring bus users.

Thus, the bus users are always able to generate their own control telegrams and rapidly exchange them with one another on account of the short length thereof, and in particular as long as no data telegrams from bus coupler 30 for the lower-level bus system are present. As described, transmitter 132 of bus user 40 transmits information concerning the reception state of the second interface 130 to receiver 82 of bus user 50, while transmitter 81 of bus user 50 transmits information in its generated internal control telegrams concerning the reception state of first interface 80 to bus user 40.

The case is now assumed for which the data processing and control unit 90 has determined that the reception quality with regard to the combination of receiver 82, reception line Rx1, and transmitter 132 has degraded and has dropped below a predefined threshold value. In response to the determined drop in quality, the data processing and control unit 90 writes into field 202 of the currently generated control telegram a logical "0," for example, which indicates that the reception quality at receiver 82 is excessively poor. This control telegram is transmitted from transmitter 81 to receiver 131 of bus user 40. The data processing and control unit 120 reads field 202 of the received control telegram, and based on the logical "0" recognizes that the connection to the neighboring bus user 50 is impaired. The data processing and control unit 120 is then able to close the second interface 130. As a result of the ability to regularly exchange control telegrams between the neighboring bus users via independent communication cycles, the bus users are able to recognize errors very quickly and respond to same, for example in order to close their second interface which precedes a fault location. The portion of the lower-level bus system 15 which precedes the source of interference may then continue operation. Due to the decentralized monitoring of the lower-level bus system 15 by means of independent communication cycles between neighboring bus users, the bus system 15 may be quickly modified in the event of error. The described measures also allow bus users to be replaced or switched on and off, even during continuous operation ("hot swapping").

A scenario is now considered in which bus user 50 is able to recognize that erroneous control telegrams have arrived from bus user 40. As described, in the error-free case control telegrams of bus user 40 which are transmitted to bus user 50 contain the interface identifier "2" for the second interface 130 in field 201. However, the last control telegram received now contains the interface identifier "1" for the first interface 110 of bus user 40. Such an error may occur when the data processing and control unit 120 is defective, an internal short circuit has occurred between transmitter 132 and receiver 131, for example, and/or crosstalk from reception line Rx1 has occurred on transmission line Tx1 within an interface. Bus user 50 is able to respond to the recognized error by writing into field 202 of a further control telegram intended for bus user 40 a logical "0," which indicates poor reception by receiver 82. The corresponding control telegram is transmitted from transmitter 81 to receiver 131. Bus user 40 may then once again close its second interface unit 130 or also the first interface 110. In addition, bus user 50 is able to generate a control telegram and transmit same to bus coupler 30 or to a higher-level control system (not shown) in order to notify service personnel that bus user 40 is defective. Similarly, each bus user is able to transmit internal control telegrams to its respective neighboring bus users in order to inform same of its current state, based on the interface identifier and information concerning the reception quality of the particular interface which communicates with the corresponding bus user.

It is now assumed that the bus users exchange control telegrams over independent communication cycles, which may have the structure shown in FIG. 3c. However, fields 204, 210, and 212 are not generated.

Figure 2:
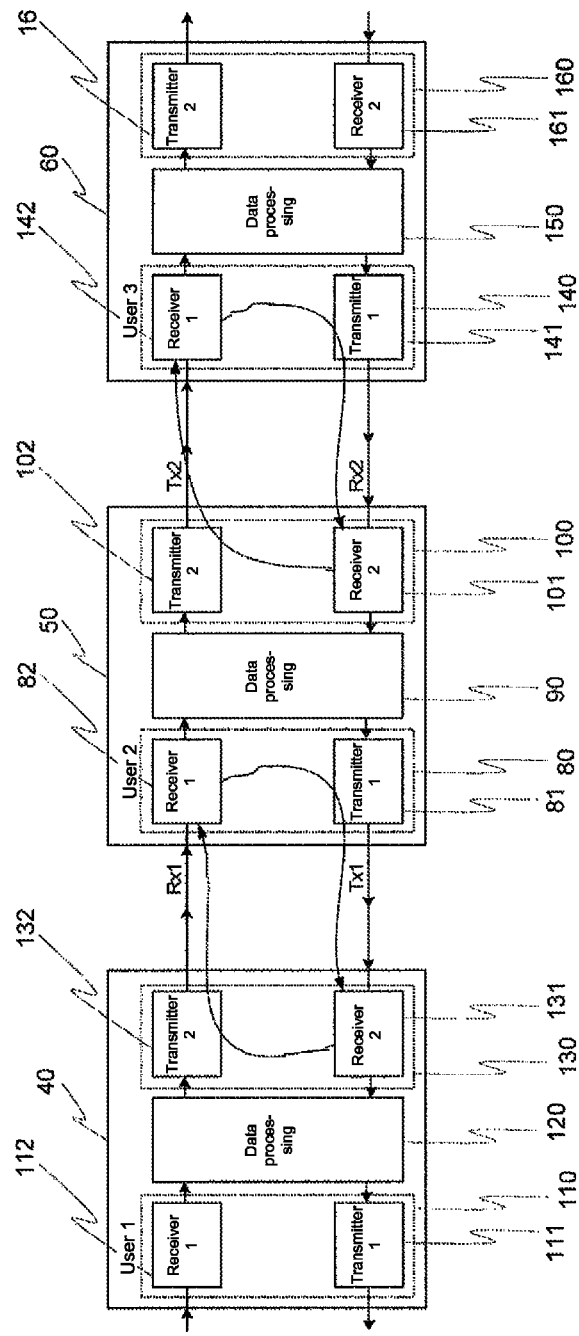
FIG. 2: shows a section of the lower-level bus system shown in FIG. 1, having two autonomous monitoring communication cycles.

The mode of operation, which applies to all bus users, is explained below once again with reference to the independent communication cycles between bus users 40 and 50 as well as 50 and 60, shown in FIG. 2. However, only control telegrams which are transmitted from bus user 40 to bus user 50, and from bus user 60 to bus user 50, are considered.

It is now assumed that bus user 40 has already sent five control telegrams, but no data telegrams, via transmitter 132 to bus user 50. The number of control telegrams sent from transmitter 132 to bus user 50 is consecutively counted using a transmission counter, and is written into field 205 of the corresponding control telegram. Such a transmission counter is shown in FIG. 1 for the example of bus user 50, and is denoted by reference numeral 93. The first control telegram thus contains the consecutive number "1" in field 205, while field 205 of the last transmitted, fifth control telegram contains the number "5." It is also assumed that state information fields 206 and 207 of the five control fields previously transmitted to bus user 50 contain a counter reading "0." This means that bus user 40 recognizes all control telegrams received at its first interface 110 and all control telegrams previously received at its second interface 130 from bus user 50, and also has received no distorted control telegrams. The manner in which incorrectly received control telegrams or distorted control telegrams may be recognized and counted by a bus user is explained below with regard to bus user 50. The counter status field 208 of the first five control telegrams transmitted to bus user 50 contains the message that all counters contain valid values. Bus user 40 enters into field 209 of each control telegram to be transmitted the check sum, which is computed over all data fields which precede data field 209. Bus user 40, i.e., data processing and control unit 120, has correctly written the identifier "2" for the second interface 130 into field 201 of each of the five control telegrams transmitted to bus user 50. The reception status of receiver 131 during the transmission of the five control telegrams was satisfactory, which is indicated by a corresponding entry in field 202 of each of the five previously transmitted control telegrams. It is further assumed that bus user 50 has already received six control telegrams, but has received no data telegrams, from user 60. All six control telegrams contain the counter reading "0" in fields 206 and 207, and in field 208 contain information that the counters are delivering valid values. The control telegrams sent from transmitter 142 to bus user 50 are consecutively counted by a transmission counter. The appropriate consecutive number is written into field 205 of the corresponding control telegram. Such a transmission counter is shown in FIG. 1 for the example of bus user 50, and is denoted by reference numeral 92. The first control telegram sent thus contains the consecutive number "1" in field 205, while field 205 for the last transmitted, sixth control telegram contains the consecutive number "6." The respective check sum is entered in field 209. Bus user 60, i.e., data processing and control unit 150, has correctly written the identifier "1" for the first interface 140 into field 201 of each of the six control telegrams transmitted to bus user 50. The reception status with regard to the interface 140 was satisfactory during the transmission of the six control telegrams, which is indicated by a corresponding entry in field 202 of each of the six previously transmitted control telegrams.

In order for bus user 50 to be able to determine whether control telegrams are unrecognized or have been lost, reception counter 94 counts all control telegrams arriving at receiver 82, while reception counter 91 counts all control telegrams arriving at receiver 101. The data processing and control unit 90 then compares the counter value of the particular counter to the counter value contained in field 205 of a control telegram. It is assumed that reception counter 94 is at the value "4" after it has received the fifth control telegram from bus user 40. It is further assumed that reception counter 91 is likewise at the value "4" after it has received the sixth control telegram from bus user 60. The data processing and control unit 90 then compares the consecutive number "5" received in the fifth control telegram to the count value of reception counter 94, and compares the consecutive number "6" received in the sixth control telegram to the count value of reception counter 91. The data processing and control unit thus determines that at the first interface 80 one control telegram, and at the second interface 100 two control telegrams, have previously not been recognized. Unrecognized control telegrams and/or data telegrams are consecutively counted with regard to the first interface in a first error counter, and are counted with regard to the second interface in a second error counter. The first and second error counters may be components of the data processing and control unit.

Such error monitoring is generally carried out over a fairly long period of time in each bus user connected to the bus system 15, and in particular is based on all received and sent control telegrams and/or data telegrams.

The data processing and control unit 90 then generates two control telegrams, one of which is to be transmitted to bus user 40, and the other, to bus user 60. The data processing and control unit also writes the number of unrecognized control telegrams with regard to the first interface 80 into field 206, and writes the number of unrecognized control telegrams with regard to the second interface 100 into field 207, of the two control telegrams.

Alternatively or additionally, the data processing and control unit 90 of bus user 50 may determine whether, and if so how many, data telegrams and/or control telegrams directed to it have been misrecognized. As a rule, this type of error monitoring is preferred. For this purpose, the data processing and control unit 90 computes a check sum over the predefined fields of each received control telegram, and compares the computed check sum to the check sum in field 209 of the particular control telegram. If all check sums match, the control telegrams arriving from bus users 40 and 60 have been received at the bus user without distortion. However, if the data processing and control unit 90 recognizes distorted control telegrams which have been received at receiver 82, the error value is incremented by one in a third error counter, which for example is implemented in the data processing and control unit 90. The error values of the first and third error counters are then added. The sum of the two error values is written into field 206 associated with the first interface 80. However, if the data processing and control unit 90 recognizes, for example, a distorted control telegram which has been received at receiver 101, the current error value is incremented by one in a fourth error counter. The error values of the second and fourth error counters are added. The sum of the two error values is written into field 207 associated with the second interface 100. Bus user 50 is thus able to recognize internal errors with regard to the transmission paths composed of receiver 82, reception line Rx1, and transmitter 132, and of receiver 101, reception line Rx2, and transmitter 141.

In addition, in fields 206 and 207 of control telegrams which it receives from bus user 40 or from bus user 60, bus user 50 is informed of the number of misrecognized and/or unrecognized control telegrams with regard to interfaces 110 and 130 of bus user 40, or interfaces 140 and 160 of bus user 60. This also applies for the other bus users.

In this manner, each bus user is able to monitor the behavior of its own two interfaces and the behavior of the two interfaces of its neighboring bus users. If a bus user recognizes a relative accumulation of errors with regard to one of the six monitored interfaces, at any given time it is able to write appropriate error information into a received data telegram, and transmit same back to bus coupler 30 via the bus system 15.

In addition, in the error-free case the data processing and control unit 90 writes into field 201 of the control telegram intended for bus user 40 the identifier "1" for the first interface 80, and writes into field 201 of the control telegram intended for bus user 60 the identifier "2" for the second interface 100. The data processing and control unit 90 also writes into field 202 of the control telegram intended for bus user 40 the reception state regarding interface 80, and writes into field 202 of the control telegram intended for bus user 60 the reception state regarding interface 100. Furthermore, the data processing and control unit 90 computes the check sum for the control telegram directed to bus user 40, and the check sum for the [control] telegram directed to bus user 60, and enters the check sum into field 209 of the particular control telegram. Lastly, the consecutive number determined by transmission counter 93 is written into field 205 of the control telegram directed to bus user 60, and the consecutive number determined by transmission counter 92 is written into field 205 of the control telegram directed to bus user 40. Finally, in independent communication cycles bus user 50 transmits the control telegram directed to bus user 40 to receiver 131 via transmitter 81, and transmits the control telegram directed to bus user 60 to receiver 142 via transmitter 102. Bus users 40 and 60 are then able to evaluate the received control fields in the previously described manner, and to transmit further control telegrams to bus user 50 and receive same from bus user 50.

The start identifier used in the control telegrams according to FIG. 3c or 3d has a bit pattern which allows each bus user to be synchronized.

It is mentioned once more that the fields of the control telegrams shown in FIGS. 3c and 3d are only examples, and may also be combined and deleted as desired. The fields of the control telegrams may in each case accommodate one bit, multiple bits, or even multiple bytes.

2. Interruption of the Transmission of Control Telegrams in Local Independent Communication Cycles It is now assumed that at least one Ethernet telegram has arrived at the bus coupler, the payload data of which are to be transmitted via the internal bus system 15.

As described above, the Ethernet telegram 170 shown in FIG. 3a is converted by the telegram converter 33 to, for example, the internal data telegram 180 shown in FIG. 3b. According to one preferred embodiment variant, the telegram converter 33 inserts only the payload data of the Ethernet telegram into data field 211 of the internal data telegram 180. The remaining fields in the telegram structure shown by way of example in FIG. 3b are written into bus coupler 30 as follows:

The start identifier illustrated in FIG. 3b is written into field 200.

Fields 201 and 202 are written into only by the bus users.

Field 203 contains, for example, information concerning the number of fields and their content, and the type of the connected external network 20 and of the lower-level bus system 15.

Bus coupler 30 writes into field 204 the consecutive number of the internal data telegrams actually transmitted via the lower-level bus system 15. In the present example, field 204 contains the number "1."

Fields 205 through 208 are written into only by the bus users.

Bus coupler 30 writes the check sum into field 209.

Field 210 is written into by the bus users when data telegrams or control telegrams are passed through.

Field 212 contains a predefined stop identifier.

If further Ethernet telegrams are received by bus coupler 30, these Ethernet telegrams may each be similarly converted to an internal data telegram, which in field 204 contains the current consecutive number of the data telegrams and/or control telegrams actually transmitted, and in field 209 contains the corresponding check sum.

To allow the payload data to be transmitted in real time by bus coupler 30 via the lower-level bus system 15 with a small amount of jitter, a start identifier is used which allows control telegrams to be transmitted between neighboring bus users within a very short time, and preferably to be interrupted or terminated within a bit duration. The start identifiers shown in FIGS. 4a and 4b, for example, are used for this purpose.

The first internal data telegram generated by bus coupler 30 is then transmitted via transmitter 34 to receiver 112 of the first bus user 40. The data processing and control unit 120 as well as the data processing and control units of the other bus users are designed to differentiate the start identifier of the control telegrams from the start identifier of a received data telegram. After the data processing and control unit 120 of bus user 40 has evaluated the third start bit of the start identifier of the received data telegram, it is aware that a data telegram has arrived. The data processing and control unit then terminates the generation and transmission of control telegrams to bus user 50. At the same time, the data processing and control unit begins to read the payload data intended for bus user 40 from the data block of field 211 assigned to it, to write its own payload data into the data block, and to write user-related state information into fields 201, 202, and 205 through 209 as described above. As explained above with regard to bus user 50, based on the check sum transmitted in field 209 the data processing and control unit is able to check whether, and if so how many, distorted data telegrams have arrived at the receiver 112. In turn, bus user 40 internally consecutively adds the misrecognized and unrecognized control telegrams and/or data telegrams with regard to the first interface 110. Thus, a current value is always stored in bus user 40 which indicates how many misrecognized and unrecognized control telegrams and data telegrams have been previously determined. The corresponding sum with regard to the first interface is written into field 206 of a data telegram and transmitted to bus coupler 30. Similarly, the current numerical value with regard to the second interface 130 is determined, which indicates how many misrecognized and unrecognized control telegrams and/or data telegrams have been previously determined. This sum is written into field 207 of a data telegram. In addition, the data processing and control unit 120 enters the number "1" into field 205, which indicates that the transmitter 132 has transmitted the first data telegram. When the third start bit begins, the data processing and control unit 120 is able to start processing of the received data telegram. With the aid of the start identifiers shown in FIGS. 4a and 4b it is thus possible not only to interrupt or terminate control telegrams at any time, but also to start the transmission of payload data in internal data telegrams on a bit-by-bit basis. In addition, the start identifiers are selected in such a way that more than one bit error must occur in order to distort the start identifier of a data telegram into the start identifier of a control telegram, or vice versa.

The data telegram containing user-related state information is then transmitted by transmitter 132 to receiver 82 of bus user 50. Within the first three start bits, the data processing and control unit 90 recognizes, in the same way as for the data processing unit 120 of bus user 40, that a data telegram has arrived. The data processing and control unit then terminates the generation and transmission of control telegrams to bus user 60. It is also able to interrupt or terminate the generation and transmission of control telegrams to bus user 40. Alternatively, however, the generation and transmission of control telegrams to bus user 40 may be interrupted or terminated when the data telegram has been transmitted after circulation from bus user 60 to bus user 50. At the same time, the data processing and control unit 90 thus starts to read the payload data intended for bus user 50 from the data block of field 211 assigned to it, to write its own payload data into the data block, and to read, and optionally evaluate and process, the state information of bus user 40 from fields 201, 202, and 205 through 210 for the checking purposes described above. A bus user writes information into field 210 which indicates an error in the current control telegram and/or data telegram. These fields may then be overwritten with state information of bus user 50. Since the data telegrams received from bus user 40 are transmitted only via transmitter 102 of the second interface 100, in the error-free case the identifier "2" is written into field 201. The data processing and control unit 90 writes into field 202 the reception quality with regard to the combination of receiver 101, reception line Rx2, and transmitter 141. The counter reading of the telegram counter 32 of bus coupler 30 contained in field 204 may also be read by the data processing and control unit 90.

After the data telegram has been completely updated, transmitter 102 transmits the data telegram to receiver 142 of bus user 60, which evaluates the received data telegram in the previously described manner, updates same, and relays it to bus user 70.

It is noted that bus user 50 may also write an error message into the, or a specific, data telegram when, as a rule over a fairly long period of time, with regard to its monitored interfaces 80 or 100 a relatively large number misrecognized or unrecognized control telegrams and/or data telegrams has been determined with regard to the additionally monitored interfaces 110, 130, 140, or 160. This error information is transmitted to bus coupler 30.

Bus user 70 closes off the ring-shaped bus system 15. The data telegram is transmitted from bus user 70 back to receiver 161 of bus user 60 in the manner previously described, then via transmitter 141 to receiver 101 of bus user 50, and lastly, via bus user 40 back to bus coupler 30. Each bus user is thus able to keep bus coupler 30 informed in a decentralized and autonomous manner concerning the state of the interfaces respectively monitored by the bus coupler, i.e., its own interfaces and those of its neighboring bus users. Maintenance personnel are thus able to recognize a malfunctioning bus user so that it may be replaced in a timely manner before it completely fails.

It is further noted that in the reverse transmission of the data telegram, in the error-free case each bus user enters into field 201 the identifier "1" instead of identifier "2" for the first interface, and enters into field 202 the reception quality of a transmission path based on the receiver, transmission line, and transmitter of the corresponding first interface. This is because the data telegram is transmitted from the transmitter of the particular first interface back to the neighboring bus user. As long as payload data are present at bus coupler 30 which are to be transmitted via the lower-level bus system 15, data telegrams are relayed, counted, and evaluated in the described manner via the bus users.

In this way, in addition to payload data each bus user is able to receive state information of a neighboring bus user in the data telegrams, and to send its own state information in the data telegrams to its neighboring bus users. As a result, the lower-level bus system 15 may also be monitored and diagnosed by connected bus users 40 through 70 in a decentralized and autonomous manner during the transmission of payload data.

Each bus user is able to recognize its own errors and errors in neighboring bus users in the manner described above. The bus users may also respond to recognized errors in the manner described.

In the transmission of payload data, data telegrams are usually sent from bus coupler 30 in a fixed time grid. Each bus user, preferably the respective data processing and control unit, may thus be designed to compute the number of data telegrams per unit time that would have to be received. Based on the transmission counter value in field 204, which indicates how many data telegrams have been transmitted by the bus coupler, each bus user may itself recognize whether data telegrams have been lost in the higher-level network, in the bus coupler, or in the lower-level bus system 15.

If bus users 40 through 70 then determine that within a settable time period no more data telegrams arrive, the bus users may start anew with the generation of control telegrams and the exchange of same with neighboring bus users in the manner described above in order to maintain decentralized and autonomous monitoring of the lower-level bus system. Alternatively, the bus users may also be informed via a corresponding data telegram or control telegram from bus coupler 30 that payload data are no longer being transmitted. The transmission counters, reception counters, and error counters of the bus users are not reset.

3. Transmission of Control Telegrams Provided by the Bus Coupler

According to another embodiment, alternatively or additionally bus coupler 30 may generate the control telegrams shown in FIGS. 3c and 3d and provide them to the lower-level bus system 15 when no payload data are available. In this case, the control telegrams are not exchanged in independent communication cycles between neighboring bus users, as illustrated in FIG. 2. Instead, the control telegrams generated by bus coupler 30, the same as for the data telegrams previously, are passed from one bus user to the next, and lastly are transmitted back to bus coupler 30 after they have been evaluated as described above and updated using user-related state information.

In particular, the first internal control telegram generated by bus coupler 30 having the structure shown in FIG. 3c is transmitted via transmitter 34 to receiver 112 of first bus user 40. It is noted that in this case the control telegram may correspond to a data telegram without a data field 211.

It is important to note that the start identifier of a data telegram illustrated in FIG. 4a may be subdivided into two bit patterns, for example "0010" and "000." The data processing and control unit 120 as well as the data processing and control units of the other bus users are designed to recognize the start identifier of a data telegram based on the first bit pattern. The second bit pattern is used to recognize possible bit errors. If a data processing and control unit recognizes a faulty start identifier based on the second bit pattern, the further processing and transmission of the corresponding data telegram is prevented.

After the data processing and control unit 120 of bus user 40 has correctly recognized the first bit pattern, it is aware that a control telegram has arrived. The data processing and control unit then starts to write user-related state information into fields 201, 202, and 205 through 210 in the manner described above. In particular, based on the consecutive number contained in field 204 the data processing and control unit 120 is able to check whether control telegrams which have arrived at receiver 112 have not been recognized. Based on the check sum transmitted in field 209, as explained above with regard to bus user 50, the data processing and control unit is able to check whether distorted control telegrams have arrived at receiver 112. The current number of misrecognized and/or unrecognized control telegrams with regard to the first interface is written into field 206. Similarly, the current number of misrecognized and/or unrecognized control telegrams with regard to the second interface is written into field 207. In addition, the data processing and control unit 120 enters the number "1" into field 205, which indicates that transmitter 132 is transmitting the first data telegram. After the first bit pattern of the start identifier is recognized, the data processing and control unit 120 may cause transmitter 132 to transmit the received control telegram to bus user 50.

In addition, the start identifier is selected in such a way that more than one bit error must occur in order to distort the start identifier of a data telegram into the start identifier of a control telegram, or vice versa.

The control telegram containing the user-related state information is then transmitted by transmitter 132 to receiver 82 of bus user 50. The data processing and control unit 90 recognizes, in the same manner as the data processing unit 120 of bus user 40 on the basis of the first bit pattern of the received start identifier, that a control telegram has arrived. The data processing and control unit 90 thus starts to read the state information of bus user 40 from fields 201, 202, and 205 through 210 for the checking purposes described above, and optionally to evaluate, store, and/or process same. These fields are then overwritten with state information of bus user 50. Since the control telegrams received from bus user 40 are transmitted only via transmitter 102 of the second interface 100, in the error-free case the identifier "2" is written into field 201. The data processing and control unit 90 writes the reception quality of receiver 101 into field 202. The counter reading of the telegram counter 32 of bus coupler 30 contained in field 204 may also be read by the data processing and control unit 90.

It is emphasized once more that each bus user monitors its own interfaces and the interfaces of its neighboring bus users over a fairly long period of time, i.e., during the transmission of millions of control telegrams and/or data telegrams, by determining the number of misrecognized and/or unrecognized control telegrams and/or data telegrams. If a bus user determines, for example, that the number of misrecognized and/or unrecognized control telegrams with regard to one of its two interfaces has significantly increased in relation to the interfaces of its neighboring bus users, the bus user is able to transmit an appropriate error message in a data telegram to bus coupler 30.

After the control telegram has been completely updated, transmitter 102 transmits the control telegram to receiver 142 of bus user 60, which evaluates and updates the received control telegram and relays it to bus user 70 in the previously described manner. Bus user 70 closes off the ring-shaped bus system 15. The control telegram is sent from bus user 70 to receiver 161 of bus user 60 in the manner described above, then via transmitter 141 to receiver 101 of bus user 50, and lastly, via bus user 40 back to bus coupler 30.

It is further noted that in the reverse transmission of the control telegram, in the error-free case each bus user enters into field 201 the identifier "1" instead of identifier "2" for the first interface, and enters into field 202 the reception quality of the receiver of the corresponding first interface. This is because the control telegram is transmitted from the transmitter of the particular first interface back to the neighboring bus user. As long as no payload data are present at the bus coupler which are to be transmitted via the lower-level bus system 15, control telegrams are relayed, evaluated, and/or processed in the described manner via the bus users.

In this manner the lower-level bus system 15 may be monitored and diagnosed in a decentralized and autonomous manner by the connected bus users 40 through 70, even when no payload data are transmitted.

Each bus user is able to recognize its own errors and errors in neighboring bus users as described above in Sections 1 and 2. The bus users may also respond to recognized errors in the manner described.

At this point it is noted that each bus user may optionally write an error message into field 208 of a control telegram or data telegram. This message indicates that the transmission counters and reception counters may possibly not have been properly updated, because, for example, the supply voltage of the particular bus user has been interrupted, or the bus user has been restarted.

Instead of generating control telegrams having the structure shown in FIG. 3c, bus coupler 30 may also generate abbreviated control telegrams, as illustrated in FIG. 3d, and transmit same via the lower-level bus system 15. In this case only the two fields 201 and 202, which contain an interface identifier or information concerning the particular reception quality of a bus user, are read and overwritten by the bus users. In the transmission of the control telegrams from the bus coupler to bus user 70, in the error-free case each bus user writes into field 201 the identifier "2" for the second interface, and writes into field 202 of the particular control telegram the reception quality of the receiver of the second interface, while in the transmission of the control telegrams from bus user 70 back to bus coupler 30, in the error-free case each bus user writes into field 201 the identifier "1" for the first interface, and writes into field 202 of the particular control telegram the reception quality of the receiver of the first interface. The evaluation of the state information in fields 201 and 202 and the system response to the evaluation are carried out in the manner described above.

4. Interruption of the Transmission of Control Telegrams Provided by the Bus Coupler The transmission of control telegrams via the lower-level bus system 15 which is initiated by bus coupler 30 may be quickly interrupted or terminated in a defined manner when Ethernet-based telegrams arrive at bus coupler 30 via the network 20 whose payload data are to be transferred to the lower-level bus system 15. Bit-for-bit transmission of data telegrams is in turn made possible by using suitable, different start identifiers for data telegrams and control telegrams.

If it is to be possible for the transmission of the control telegrams shown in FIGS. 3c and 3d to be interrupted or terminated, the individual bits of the payload information fields (201 through 210, or 201 and 202) are separated by fixed bit sequences or individual bits. This measure prevents a valid start identifier for a data telegram from being erroneously generated from an interrupted control telegram First of all, it is assumed that as soon as it has received an Ethernet telegram, bus coupler no longer generates control telegrams.

As described above, the Ethernet telegram 170 shown in FIG. 3a is converted by the telegram converter 33 into, for example, the internal data telegram 180 shown in FIG. 3b.

According to one preferred embodiment variant, the telegram converter 33 inserts only the payload data of the Ethernet telegram into data field 211 of the internal data telegram 180. Further data are advantageously not accepted.

If further Ethernet telegrams are received by bus coupler 30, these Ethernet telegrams may each be similarly converted to an internal data telegram. Field 204 then contains the current consecutive number, field 209 contains the corresponding computed check sum, and field 211 contains the payload data of the particular Ethernet telegram to be transmitted.

To allow the payload data to be transmitted in real time by bus coupler 30 via the lower-level bus system 15 with a small amount of jitter, once again a start identifier is used which allows control telegrams to be transmitted between neighboring bus users within a very short time, and preferably to be interrupted or terminated within a bit duration. The start identifier shown in FIG. 4a, for example, is used for this purpose.

The first internal data telegram generated by the bus coupler is then transmitted via transmitter 34 to receiver 112 of first bus user 40. The data processing and control unit 120 as well as the data processing and control units of the other bus users are designed to differentiate the start identifier of the control telegrams from the start identifier of a received data telegram. After the data processing and control unit 120 of bus user 40 has evaluated the second start bit of the start identifier of the received data telegram, it is aware that a data telegram has arrived. The data processing and control unit then terminates the transmission of control telegrams to bus user 50 with the next received start bit. The remaining bus users respond in a similar manner in evaluating the start identifier of the first received data telegram.

The further method sequence corresponds to the sequence described in Section 2, "Interruption of the transmission of control telegrams in local independent communication cycles."

What is claimed is:

1. A bus coupler (30) comprising:
    an external interface for connecting to an external network (20) on which network-specific telegrams may be transmitted;
    an internal interface (34, 35) for connecting multiple bus users (40-70) in series to a ring-shaped transmission path of a lower-level bus system (15); and
    a converter device (33) that is able to convert a network-specific telegram (170) received via the external interface to an internal data telegram (180) for transmission via the ring-shaped transmission path and that contains no control data of the network-specific telegram,
    wherein the internal data telegram (180) is relayed to the internal interface (34) and is output on the ring-shaped transmission path,
    wherein the internal data telegram contains at least one state information field (201) for internal control information,
    wherein when the internal data telegram passes through the corresponding bus user on the ring-shaped transmission path, each bus user (40-70) connected to the internal interface (34, 35) exchanges the payload data intended for the particular bus user with the internal data telegram (180) circulating on the transmission path,
    wherein the bus user is able to extract payload data from a data block, associated with the bus user, in the data field (211) of the internal data telegram (180), and to extract internal control information from the at least one state information field (201) of the internal data telegram (180), and to insert payload data into the data block, associated with the bus user, of the data field of the internal data telegram, and to insert its internal control information into the at least one state information field (201) of the internal data telegram (180).

2. The bus coupler according to claim 1, wherein the external network is an Ethernet-based network (20), and the network-specific telegrams are Ethernet telegrams.

3. The bus coupler according to claim 1, wherein the converter device (33) is designed in such a way that it is able to convert multiple network-specific telegrams received via the external interface to an internal data telegram that contains no control data of the network-specific telegrams.

4. The bus coupler according to claim 1, wherein the converter device (33) is designed in such a way that it is able to convert an internal data telegram (180) received via the internal interface (35) to at least one network-specific telegram (170) for transmission via the external interface.

5. The bus coupler according to claim 1, further comprising a device for generating internal control telegrams (190, 220) that in each case contain a start identifier field (195) for a start identifier that identifies the internal control telegram, and contains at least one state information field (201-210) for bus coupler-related and/or bus user-related state information which is used for decentralized monitoring of the communication between two respective bus users,
    wherein the internal data telegram (180) contains a start identifier field (200) for a start identifier that identifies the internal data telegram, and the internal control information contains bus user-related state information which is used for decentralized monitoring of the communication between two respective bus users, wherein the start identifier that identifies an internal control telegram and the start identifier that identifies an internal data telegram are different.

6. The bus coupler according to claim 5, further comprising a control unit for initiating the transmission of internal control telegrams (190, 220) via the internal interface on the ring-shaped transmission path when no payload data are present for transmission via the ring-shaped transmission path.

7. The bus coupler according to claim 6, wherein in response to a start identifier that identifies an internal data telegram, the control unit is able to interrupt or terminate the transmission of internal control telegrams in a defined manner, thus allowing transmission of the internal data telegram in real time.

8. The bus coupler according to claim 1, further comprising a telegram counter (32) for counting consecutively the internal data telegrams and/or control telegrams to be sent via the internal interface (34), and
    wherein the internal data telegrams and/or control telegrams each contain a first state information field (204) into which the bus coupler is able to write the particular value of the telegram counter.

9. A communication system (10) having:
    a bus coupler (30) according to claim 1; and
    multiple bus users (40-70) that are connected in series via a ring-shaped transmission path to the internal interface of the bus coupler, wherein the bus users (40-70) are each designed to interpret the internal data telegrams (180) passing through on the ring-shaped transmission path and to carry out a data exchange.

10. The communication system according to claim 9, wherein each bus user (50) has the following features:
    a first interface (80) having a first transmitting and receiving unit (81, 82) for transmitting and receiving internal data telegrams or control telegrams to or from a first neighboring bus user (40); and a second interface (100) having a second transmitting and receiving unit (101, 102) for transmitting and receiving internal data telegrams or control telegrams to or from a second neighboring bus user (60).

11. The communication system according to claim 9, wherein each bus user (50) has a device (90) for generating internal control telegrams, each containing a start identifier field (195) for a start identifier that identifies the internal control telegram, and at least one state information field (201, 202) for bus user-related state information, wherein the internal control telegrams generated by the particular bus user (50) are transmitted only to the neighboring first and/or second bus users (40, 60) of said bus user.

12. The communication system according claim 10, wherein an interface identifier is respectively associated with the first and the second interface (80, 100) of each bus user, and the internal data telegrams and/or control telegrams each contain an additional state information field (201) for an interface identifier, wherein each bus user has a device (90) for reading an interface identifier and for writing an interface identifier into the additional state information field (201).

13. The communication system according to claim 9, wherein each bus user (50) has a device for determining the reception quality of the first and the second interface (80, 100), and the internal data telegrams and/or control telegrams each contain an additional state information field for reception state information (202), wherein each bus user has a device for reading reception state information and for writing reception state information into the additional state information field.

14. The communication system according to claim 9, wherein each bus user (50) has a device (90) that is able to close the particular first or second interface in response to at least one reception state information item contained in an internal data telegram or control telegram.

15. The communication system according to claim 9, wherein each bus user (50) has a device (90) for interrupting or terminating the generation and/or transmission of internal control telegrams (190, 220) in a defined manner in response to the start identifier (200) contained in a received internal data telegram, thus allowing the internal data telegram (180) to be transmitted in real time.

16. The communication system according to claim 9, wherein the start identifier that identifies an internal data telegram or control telegram contains a bit pattern that may be used for synchronizing the particular bus user.

17. The communication system according to claim 9, wherein the start identifier (200) that identifies an internal data telegram and the start identifier (195) that identifies a control telegram respectively contain different bit patterns in such a way that the transmission of internal control telegrams may be interrupted or terminated in a defined manner.

18. The communication system according to claim 9, wherein the start identifier that identifies an internal data telegram and/or the start identifier that identifies a control telegram each contain a first and a second bit pattern, wherein each bus user is designed in such a way that it recognizes a received start identifier by means of the first bit pattern.

19. The communication system according to claim 9, wherein the internal control telegram contains a data field for transmitting safety-relevant data, and the bus coupler and/or each bus user is/are designed for reading safety-relevant data from the data field and for writing safety-relevant data into the data field.

20. The communication system according to claim 10, wherein each bus user (50) has an error recognition device (90), associated with the first and the second interface (80, 100), for detecting internal data telegrams and/or control telegrams that have been incorrectly received and/or that have not been recognized at the first and/or second interface, wherein the internal data telegrams and/or control telegrams each contain two additional state information fields (206, 207) into which the particular result from the detection device may be written.

21. The communication system according to claim 20, wherein the error recognition device has a telegram counting device (92, 93), associated with the first and the second interface (80, 100), for counting consecutively the internal data telegrams and/or control telegrams to be sent via the first interface (80), and for counting consecutively the internal data telegrams and/or control telegrams to be sent via the second interface (100), and wherein the internal data telegrams and/or control telegrams each contain a telegram number field (205) as an additional state information field, into which the particular value of the first telegram counting device (92, 93) may be written and transmitted to a neighboring bus user (40, 60).

22. The communication system according to claim 21, wherein the error recognition device also has:

a second telegram counting device (91, 94), associated with the first and the second interface (80, 100), for counting the internal data telegrams and/or control telegrams received at the first interface and counts the internal data telegrams and/or control telegrams received at the second interface; and a comparator for comparing the count value received in a data telegram and/or control telegram, which indicates how many data telegrams and/or control telegrams a neighboring bus user has previously transmitted via the corresponding first or second interface, to the count value determined by the second telegram counting device.

23. The communication system according to claim 20, wherein each bus user has a device for generating a check sum, and the internal data telegrams and/or control telegrams each have a check sum field (209) as an additional state information field into which the particular bus user is able to write the generated check sum, and each bus user has a device for reading and evaluating the check sum received in an internal data telegram and/or control telegram.

24. A method for exchanging data between a network (209), on which Ethernet telegrams may be transmitted, and multiple bus users (40-70) via a bus coupler (30), the network being connected to an external interface of the bus coupler (30), and the multiple bus users (40-70) being connected in series to a ring-shaped transmission path via an internal interface (34, 35) of the bus coupler (30), the method comprising:

converting, in a converter device (33), an Ethernet telegram (170) received via the external interface of the bus coupler (30) to an internal data telegram (180) that contains no control data of the Ethernet telegram and that contains at least one state information field (201) for internal control data;

relaying the internal data telegram (180) to the internal interface of the bus coupler (30);

outputting, from the internal interface of the bus coupler, the internal data telegram (180) on the ring-shaped transmitted path; and when the internal data telegram passes through the corresponding bus user on the ring-shaped transmission path, exchanging, by each bus user connected to the internal interface, the payload data intended for the bus user with the internal data telegram circulating on the transmission path;

wherein the bus user is able to extract payload data from a data block, associated with the bus user, in the data field (211) of the internal data telegram (180), and to extract internal control data from the at least one state information field (201) of the internal data telegram (180), and to insert payload data into the data block, associated with the bus user, of the data field (211) of the internal data telegram, and to insert internal control data into the at least one state information field (201) of the internal data telegram.

25. The method according to claim 24, wherein the internal control data contain bus user-related state information, and each bus user is able to generate internal control telegrams (190, 220), each containing a start identifier field (195) for a start identifier that identifies the internal control telegrams, and at least one state information field (201) for bus user-related state information, that are used for decentralized and autonomous monitoring of the communication between two respective bus users (40, 50; 50, 60), and when no internal data telegrams (180) are present in the bus coupler (30) for transmission, respective neighboring bus users (40, 50; 50, 60) exchange, via independent communication paths, internal control telegrams (190, 220) that are used for decentralized and autonomous monitoring of the communication between two respective bus users.

\* \* \* \* \*